United States Patent [19]

Smith

[11] 4,250,836
[45] Feb. 17, 1981

[54] PORTABLE CORRAL

[76] Inventor: Karl Smith, P.O. Box 347, Bakersfield, Calif. 93307

[21] Appl. No.: 4,352

[22] Filed: Jan. 18, 1979

[51] Int. Cl.³ .................... E04H 17/18; A01K 1/02
[52] U.S. Cl. ...................................... 119/20; 256/25
[58] Field of Search .............. 119/20, 82; 256/24, 256/25; 280/491 B, 491 C, 491 D

[56] References Cited

U.S. PATENT DOCUMENTS

| | | | |
|---|---|---|---|
| 2,935,965 | 5/1960 | Smith | 119/82 |
| 2,995,386 | 8/1961 | Peterson | 280/491 D |
| 3,726,256 | 4/1973 | Bernhardt et al. | 119/20 |
| 3,741,529 | 6/1973 | Blagg | 119/20 X |
| 3,817,558 | 6/1974 | Eger | 280/491 D |
| 3,921,585 | 11/1975 | Hall | 119/20 |
| 4,013,303 | 3/1977 | Milner | 280/491 D |
| 4,090,472 | 5/1978 | York | 119/20 |

FOREIGN PATENT DOCUMENTS 292428 10/1966 Australia ........................... 119/82
942108 2/1974 Canada ............................. 119/20

*Primary Examiner*—Robert Peshock
*Assistant Examiner*—Robert P. Swiatek
*Attorney, Agent, or Firm*—Poms, Smith, Lande & Rose

[57] ABSTRACT

A portable corral is disclosed particularly adapted for confining and directing the movement of livestock. The corral comprises two major sections—a self-supporting section and a wheeled section capable of holding and transporting the self-supporting section. Foldable side members are incorporated for interconnecting the two major sections. The trailering section incorporates a pull-tongue hingedly attached to the trailering section and capable of being disassembly whereby it can be connected into a Y-shape for pulling the trailer and disconnected and hingedly rotated away from the cattle during deployment.

5 Claims, 21 Drawing Figures

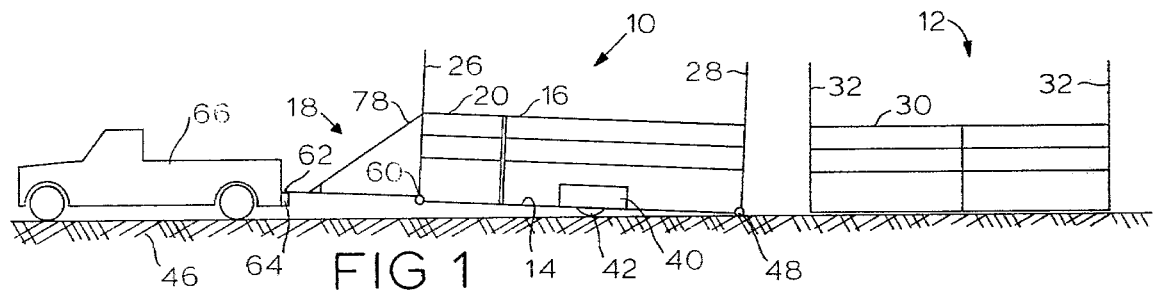
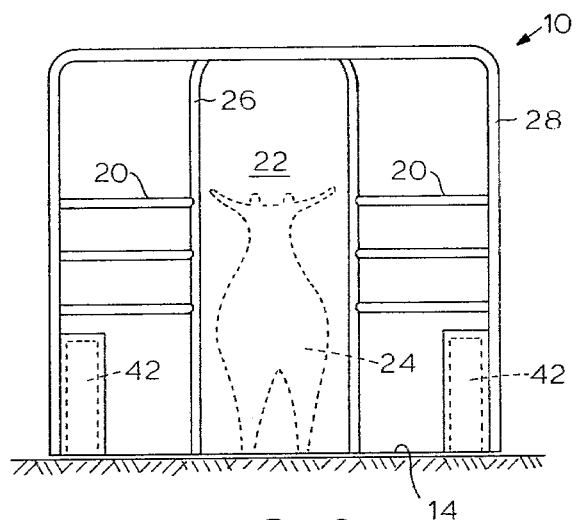
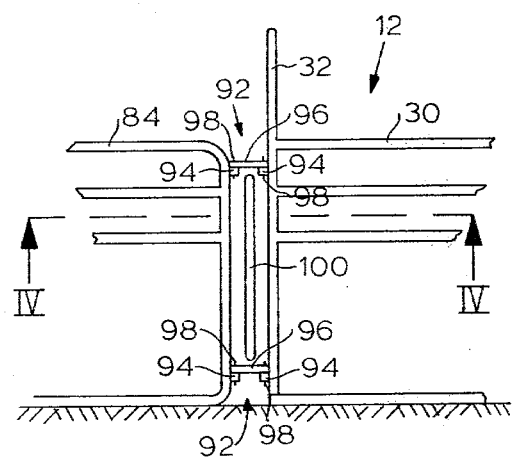
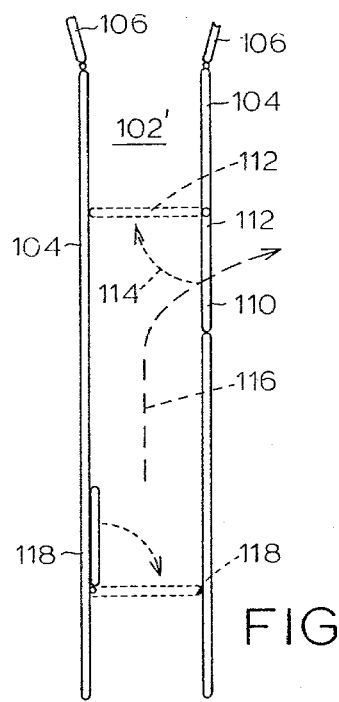
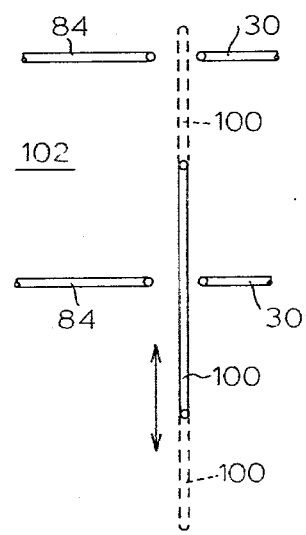

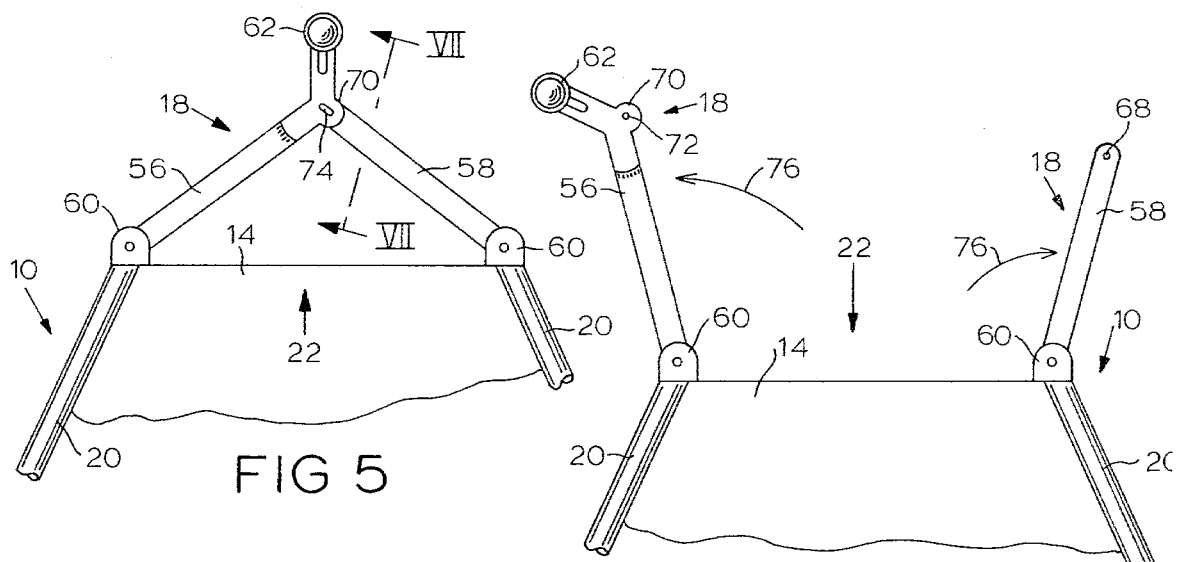
FIG 5
FIG 6
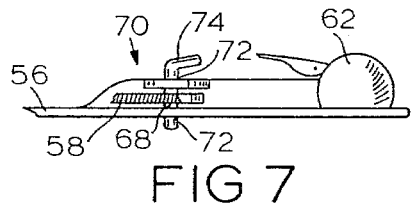
FIG 7
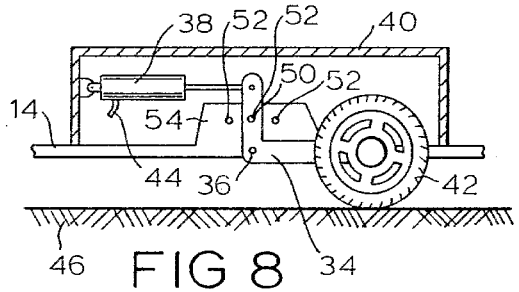
FIG 8
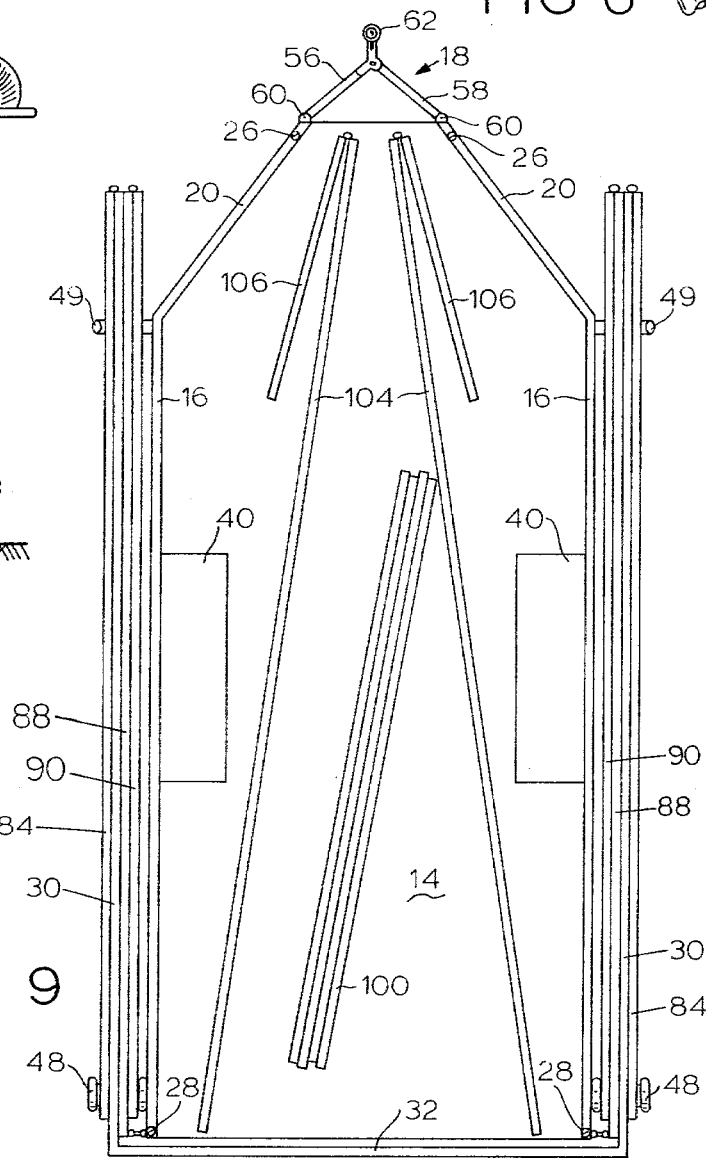
FIG 9

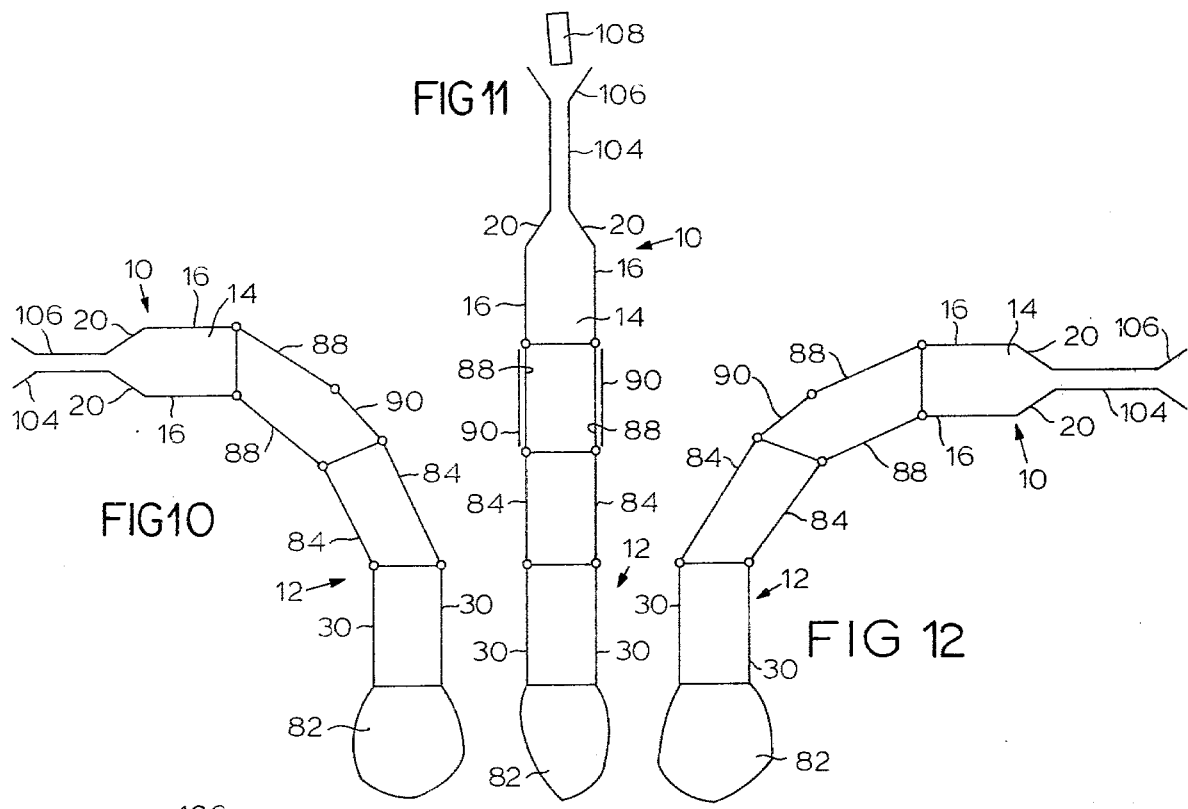
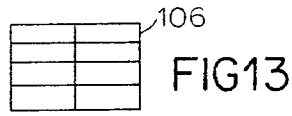
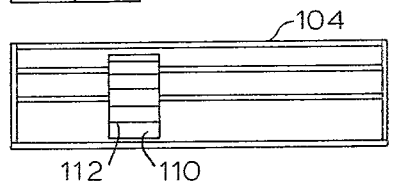
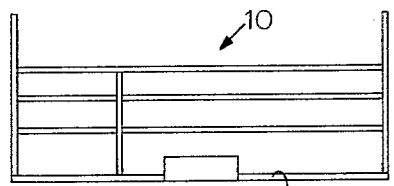
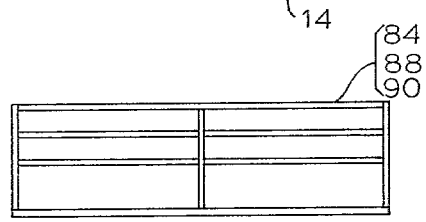
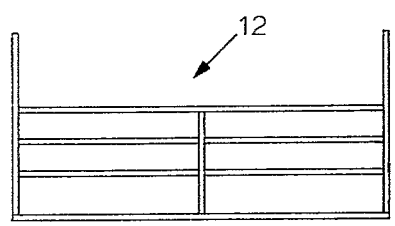
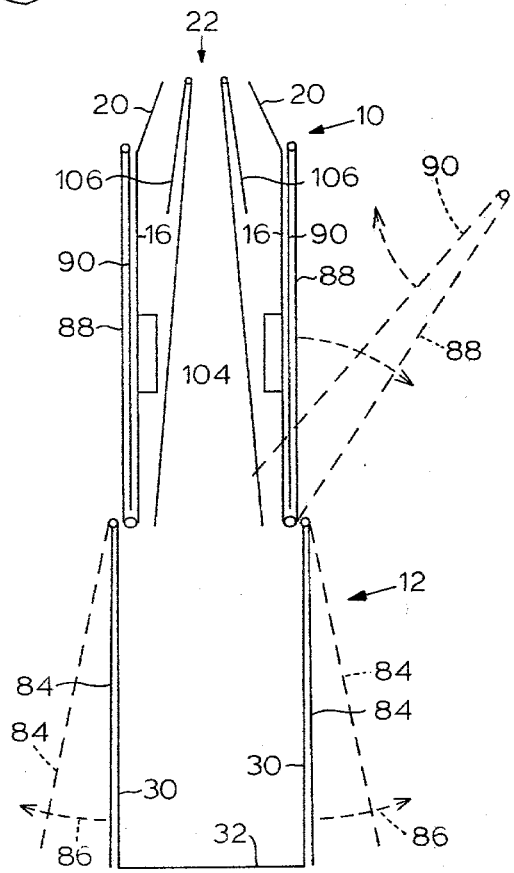

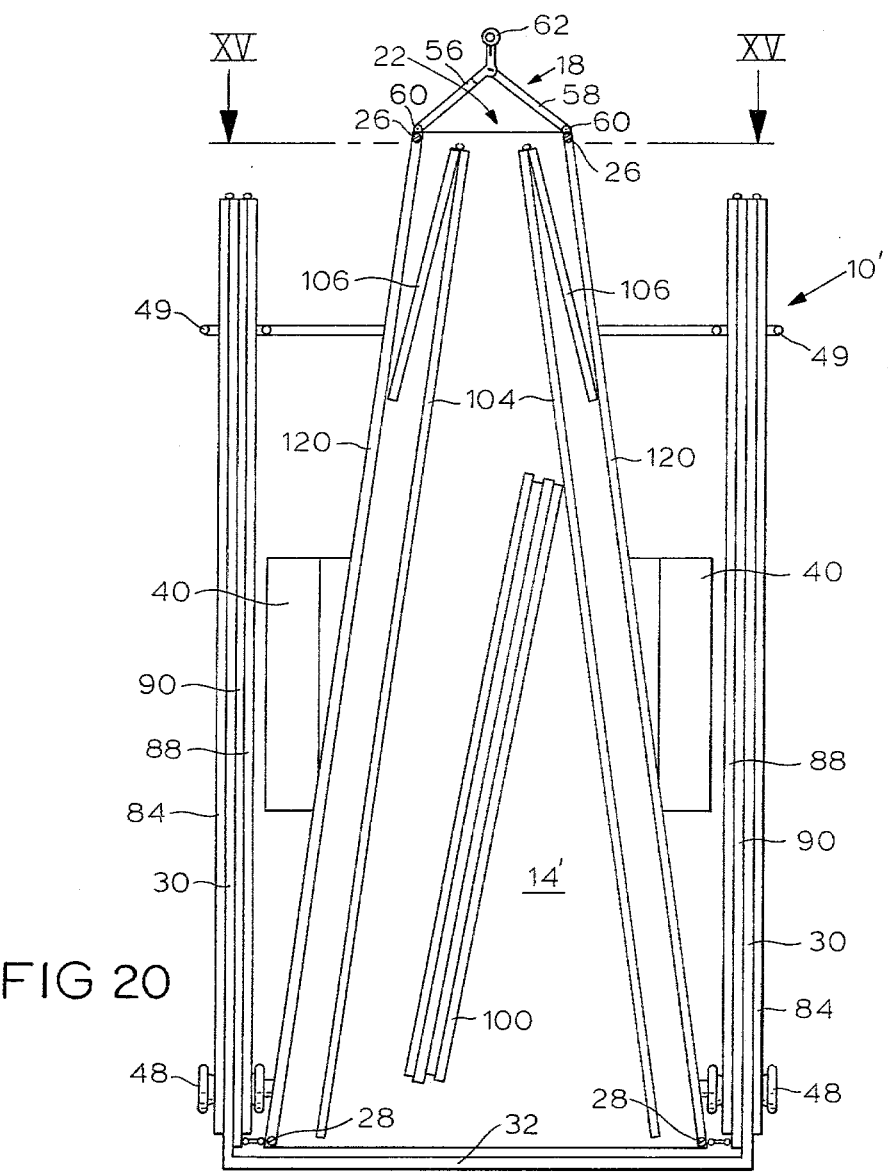
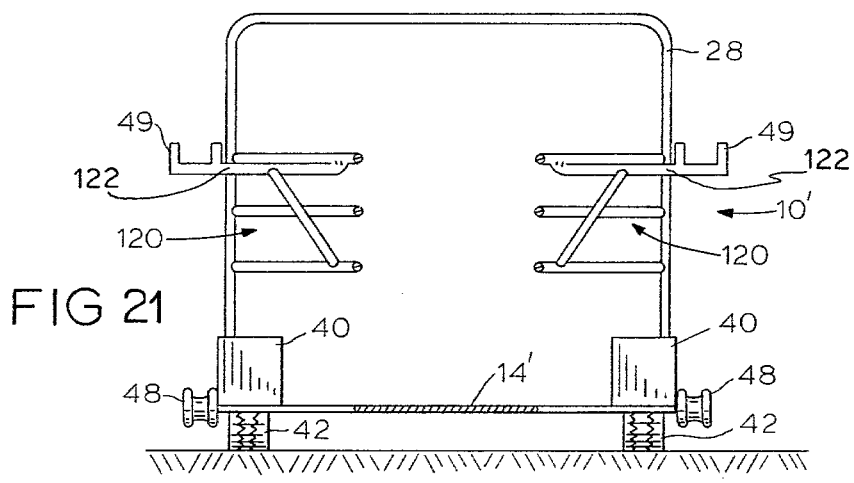

PORTABLE CORRAL

BACKGROUND OF THE INVENTION

The present invention relates to animal corrals and more particularly to transportable corrals which can be transported to remote sites, assembled for use, and, thereafter, disassembled for transporting to another site.

In many areas, particularly the southwestern United States, large areas of land are available for the grazing of cattle, sheep, and other livestock. Unfortunately, the land is sparse in feed whereby the number of livestock per acre which the land will support is few. It is common practice in such areas, to graze the live stock on the grass lands during the early periods of their growth. Thereafter, the livestock are moved to a feedlot where they are confined and brought up to selling weight with commercial feeds.

In rounding up the livestock for transportation from the grass lands to the feed lots, corrals must be employed wherein the livestock can be brought into a central area and maintained until loaded for transportation. The time and cost of locating corrals at various locations within grazing lands which may extend over hundreds of acres can be extensive. Therefore, it is desirable that a sturdy portable corral structure be available that can withstand the pressures of milling livestock while, at the same time, being easily deployable for use and easily and compactly trailerable for movement between locations.

Portable corral structures are not completely unknown. For example, in the U.S. Pat. No. 4,090,472 to York, a horse trailer and attendant corral structure is disclosed comprising uncoilable cables to be connected to posts inserted in the ground.

The Canadian Pat. No. 942,108 to Caddoo, discloses a portable cattle corral which extends outwardly from a trailer and stores on the sides thereof.

A similar corral to that of Caddoo is shown in the U.S. Pat. No. 3,921,585 to Hall.

The U.S. Pat. No. 3,741,529 to Blagg shows a horse trailer having a plurality of fence sections stored inside which can be deployed to form a corral in conjunction with the trailer whereby the horses can go into the trailer and out of the trailer into the corral.

The U.S. Pat. No. 3,726,256 to Bernhardt et al. shows another horse trailer having corral sections associated therewith. Whereas the Blagg invention carried its corral sections inside the trailer, that of Bernhardt et al. carries them outside.

Of the foregoing, only the apparatus of Caddoo begins to approximate the needs of a rancher corraling a number of livestock in preparation for transport. The Caddoo apparatus, however, is adaptable for holding only a few livestock and does not support the loading and unloading of livestock or the cutting operations normally attendant thereto wherein livestock which have been included within the group rounded up can be selectively removed from the group for various reasons.

Wherefore, it is the object of the present invention to provide a portable corral structure particularly adapted for use in loading and unloading operations of large numbers of livestock as heretofore only a permanently mounted structure would suffice.

SUMMARY OF THE INVENTION

A portable corral for confining and directing the movement of livestock. The corral has a pair of rigid planar first side members adapted to be disposed vertically in spaced relationship to form a passageway therebetween for the movement of the livestock. Each of the first side members has first releasable connector means on one end thereof. The corral has trailering means for supporting and transporting the first side members including a horizontal base member and a pair of rigid planar second side members connected to the base member vertically in spaced relationship to form a passageway therebetween for the movement of the livestock. Each of the second side members has second releasable connector means on one end thereof for interconnecting with respective ones of the first releasable connector means to form an extended passageway for the livestock comprising the first and second side members in combination. Each of the second side members also includes support means for holding respective ones of the first side members adjacent thereto for transporting. A pair of wheels are included for supporting the trailering means when transporting the first side members and a pair of adjustable wheel mounting members rotatably carrying respective ones of the wheels are attached to the base for movement between a transporting position where the base is raised with ground clearance for travelling and a deployed position where the base is resting on the ground whereby the livestock can walk on the base between the second side members. A pull-tongue is connected on one end to the base member and includes means on the other end for connecting to a vehicle pulling the trailer. The present invention accomplishes a portion of its objectives by having the pull-tongue comprise a first tongue member hingedly attached on one end to the base adjacent one side thereof and which has the vehicle connecting means on the other end; and by having a second tongue member hingedly attached on one end to the base adjacent the side opposite the attachment of the first tongue member and which has releasable means on the opposite end for connecting to the first tongue member adjacent the vehicle connecting means whereby the two tongue members can be connected in a Y-shape for pulling the trailer and be hingedly rotated away from the path of the livestock during deployment with the base resting on the ground.

In addition to the trailering section thus described, the portable corral in its preferred embodiment incorporates a self-supporting corral section comprising a pair of rigid planar third side members disposed vertically in parallel spaced relationship to form a passageway therebetween for the movement of the livestock. The third side members are spaced apart a distance slightly wider than the second side members at their widest point to allow the third side member to straddle the second side members for transporting the portable corral. Spacer means are connected between the pair of third side members for holding the third side members in the aforesaid vertical spaced relationship whereby the self-supporting corral section is made self-supporting. The spacer means are connected adjacent the top of the third side members to allow the spacer means to pass over the second side members when passing to and from the straddled position to provide room thereunder for the passage of the livestock. Means are carried by the trailing means for holding the self-supporting corral section in the straddled position and raised from contact with the ground for transporting the self-supporting corral section in combination with the trailering means and for releasing the self-supporting corral section to allow the self-supporting corral section to be slid from the straddled position into deployment for use. Means are also carried by the self-supporting corral section for releasably connecting the self-supporting corral section to the pair of first side members when the self-supporting corral section is deployed to, thereby, form an extended passageway for the movement of livestock comprising the self-supporting corral section and the first and second side members in combination.

To more fully meet the objectives of the present invention, roller means are operably carried by the trailering means for supporting the self-supporting corral section and guiding the self-supporting corral section between the straddled position and deployment. Moreover, the releasable connecting means includes a pair of rigid planar fourth side members each hingedly connected on one end to respective ones of the third side members on the same end of the self-supporting corral section. The fourth side members are rotatable about the hinged attachment between a stored position against the third side members and a deployed position extending outwardly from the third side members to contact respective ones of the first side members whereby the passageway for the movement of livestock comprises the first, second, third and fourth side members in combination.

DESCRIPTION OF THE DRAWINGS

FIG. 1 is a side elevation showing the two major sections of the corral of the present invention being deployed;

FIG. 2 is an end elevation of the trailering section of the present invention as seen from the back looking towards the front thereof;

FIG. 3 is a side elevation showing the junction between the self-supporting section of the corral of the present invention and one of the side members used for interconnecting the two major sections;

FIG. 4 is a plan view of the portion of the corral of the present invention shown in FIG. 3 depicting how slideable gate sections are employed therewith;

FIG. 5 is a plan view of the pull-tongue of the present invention in its connected position ready for trailering;

FIG. 6 is a plan view of the pull-tongue of the present invention in its disconnected and deployed position for the free passage of livestock through the trailer from one end to the other;

FIG. 7 is a cutaway side elevation of the apparatus of FIG. 5 in the plane VII—VII;

FIG. 8 is a side elevation of the preferred method of mounting the wheels in the trailering section of the present invention to provide the ability to move the trailer between the three required positions for trailering, deployment, and operation, respectively;

FIG. 9 is a plan view of the portable corral of the present invention shown in its entirely stored position ready for transportation between sites;

FIGS. 10–12 are simplified plan views showing the present invention deployed in a left 90° curve, straight line, and right 90° curve in FIGS. 10, 11, and 12, respectively;

FIGS. 13–17 show side elevations of the various side members employed in the corral of the present invention;

FIG. 18 is a simplified plan view showing the corral of the present invention during its development;

FIG. 19 is a plan view of chute of the present invention showing the gates employed therein to provide cutting action of livestock;

FIG. 20 is a plan view of an alternate embodiment of the present invention; and

FIG. 21 is a front end view of the embodiment of FIG. 20.

DESCRIPTION OF THE PREFERRED EMBODIMENT

In the description that follows, the various side members are shown individually in FIGS. 13–17 in addition to the incorporated views referred to throughout.

Referring first to FIG. 1, the portable corral of the present invention can be seen to comprise two major sections. The first is a trailering portion generally indicated as 10 and the second is a self-supporting section generally indicated as 12. As can be seen with reference to FIGS. 2, 9 and 18 taken in combination with FIG. 1, the trailering section 10 has a flat base 14 with a pair of parallel spaced vertical side members 16 connected thereto. The base 14 tapers towards the front at which location a pull-tongue, generally indicated as 18, (to be more fully described hereinafter) is located.

A second set of vertical side members 20 are attached to the base 14 tapering in combination therewith towards the pull-tongue 18 thereby forming a vertical opening 22 adjacent the pull-tongue 18. The vertical opening 22 is sized to allow the passage therethrough of one animal as exemplified by the ghosted steer 24 in FIG. 2.

The vertical side members 16 and 20 are held rigidly by spacers 26 and 28 to resist the forces imparted by the livestock. As can be seen, spacers 26 and 28 are generally of an inverted U-shape so as to provide sufficient room for the passage of livestock thereunder.

Digressing briefly to self-supporting section 12, it can be seen that self-supporting section 12 comprises a pair of vertical side members 30 rigidly held in place in vertical parallel spaced relationship by a pair of inverted U-shaped spacers 32. Spacers 32 are sized such that self-supporting section 12 can move over and straddle trailering section 10 as shown in FIG. 9. That is, vertical side members 30 are spaced slightly wider than vertical side members 16 whereby they can move alongside them on the outside. Likewise, spacers 32 are slightly wider and slightly higher than spacers 26 and 28 to pass thereover.

Returning now to the trailering section 10, further features incorporated therein to provide the benefits of the present invention will now be described. Referring first to FIG. 8, the method of mounting the wheels to accomplish the objectives of the present invention is shown. As can be seen, base 14 has an L-shaped member pivotally attached for rotation in the vertical plane by means of a pivot 36. Preferably, a hydraulic piston 38 is connected between the L-shaped member 34 and the wheel housing 40 which covers the wheel and apparatus from contact by the cattle moving therethrough. The opposite end of the L-shaped member 34 carries the wheel 42 for rotation as with a spindle and bearings (not shown). By application or removal of hydraulic pressure from hydraulic piston 38 through line 44 by conventional means (not shown), the wheel 42 can be raised or lowered with respect to base 14 to accomplish the objectives of the present invention. It is desirable that the wheels 42 be movable in combination (i.e. line 44 of each hydraulic piston 38 be connected in common)

between three main positions. The position shown in FIG. 8 corresponds to that shown in FIG. 1. In such position, the base 14 is slightly raised from the ground forming a low angle with the ground and with the back of base 14 in contact with or close adjacent with, the ground 46. A roller 48 is provided on either side of the back of base 14 to support and guide the self-supporting section 12 in its movement between the deployed position shown in FIG. 1 and the straddled position shown in FIG. 9. Support members 49 releasably hold and support self-supported section 12 in its straddled position. The low angle provided by the wheel position of FIGS. 1 and 8 allows for ease of movement of the self-supporting section 12 between these positions. This will be discussed hereinafter in greater detail. If the hydraulic piston 38 is extended further, the wheel 42 will raise the base 14 from the ground for sufficient clearance to allow transporting the corral between sites. By retracting the hydraulic piston 38 in a shortened direction, the wheel 42 is withdrawn into wheel housing 40 sufficiently to allow base 14 to seat firmly on ground 46. It is preferred that the L-shaped member 34 be provided with a hole 50 concentrically aligning with holes 52 in a plate member 54 carried by base 14 at the three described positions wherein a pin (not shown) can be inserted therethrough to maintain the wheels in their position against inadvertent movement.

Referring now to FIGS. 5, 6, and 7, the pull-tongue 18 is shown in greater detail. As can be seen, pull-tongue 18 comprises a pair of members 56 and 58 hingedly attached to base 14 as with hinges 60 adjacent the vertical opening 22. One tongue member 56 is provided with an appropriate coupler 62, of either the ball or ring type, adapted for releasable connection to the bumper 64 of a vehicle such as truck 66 of FIG. 1. The other tongue member 58 has a hole 68 adjacent the opposite end which is adapted to fit into a yoke 70 disposed in tongue member 56 adjacent coupler 62. Yoke 70 has a pair of concentrically disposed holes 72 therein adapted to align with hole 68 when tongue member 68 is inserted into yoke 70. A pin 74 is provided for insertion through the holes 68 and 72 to lock tongue members 56 and 58 into the pulling position shown in FIG. 5. This can be seen best with reference to FIG. 7. By pulling the pin 74, the two tongue members 56 and 58 are freed to be rotated away from the path of the livestock through vertical opening 22 as indicated by the arrows 76. Thus, when wheels 42 are raised into wheelhousings 40 to place base 14 on the ground 46, the complete elimination of the pull-tongue 18 from adjacent vertical opening 22 allows the livestock to move through trailering section 10 completely unhampered by obstructions. If desired, a pair of support members 78 can be connected between vertical side members 20 and tongue members 56 and 58 adjacent coupler 62 to support the weight thereof during movement between the opened and latched positions. Such arrangement can be seen with reference to FIG. 1. Support members 78 can be of cable or rods pivotally attached to members 20. An alternate embodiment of trailering section 10 providing even greater freedom of movement for the livestock therethrough is described hereinafter in relation to FIGS. 20 and 21.

Referring now to FIGS. 10-12 the corral of the present invention is shown fully deployed in various configurations. It is contemplated that the apparatus hereinbefore described and to be described hereinafter be used in combination with a general holding area generally indicated as 82 constructed of inexpensive materials such as posts and barbed wire which remain at each site. Further, having the two basic rigid portions hereinbefore described, these two portions (trailering section 10 and self-supporting section 12) can be interconnected with foldable interconnecting sections to be hereinafter described so as to provide the sizes and additional features described. For example, in a working embodiment of the present invention it is contemplated that when fully deployed as, for example, shown in FIG. 11, the entire corral would be approximately 112 feet long and 9 to 10 feet wide while, when in the moving position shown in FIG. 9, the corral would be approximately 26 feet long and about 10 feet wide.

Referring first to FIG. 11, it is contemplated that in deploying the apparatus of the present invention, the fully trailered combination as shown in FIG. 9 is backed up to the holding corral 82. The wheels 42 are then lowered to the position of FIG. 8 and self-supporting section 12 is rolled off as shown in FIG. 1 by moving truck 66 forward until trailering section 10 is positioned as shown in FIG. 11. Each of the two sections 10, 12 carries additional sections hingedly attached thereto which then can be employed to interconnect the two sections and provide an extended passageway for the movement of the livestock between the holding corral 82 and the vertical opening 22 at the forward end of trailering section 10. The movement of these various sections can best be seen with reference to FIG. 18 in combination with FIG. 11. It is preferred that the two vertical side members 30 of self-supporting section 12 each have a side member 84 hingedly attached at the forward end thereof whereby members 84 can be folded closely adjacent members 30 as shown in FIGS. 9 and 18 or moved outwardly as shown by the ghosted arrows 86 to assume the position of FIG. 11. Likewise, side members 16 have side members 88 hingedly attached thereto at the back end to rotate from a stored position adjacent side members 16 to connect with side members 84 as shown in FIG. 11. To provide the ability to curve the corral of the present invention, side members 88 further have side members 90 hingedly attached to the free ends thereof whereby a single side member 90 can be moved from its position closely adjacent side member 88 to effectively extend side member 88 thus allowing the corral to curve as shown in FIGS. 10 and 11.

It is preferred that the various sections be hingedly joined in a manner such as shown in FIGS. 3 and 4. The hinge, generally indicated as 92, employed therein comprises tabs 94 on the ends of members 30 and 84 respectively interconnected by bars 96 by means of pins 98 removably passing through appropriate aligned holes (not shown) in tabs 94 and bars 96. Thus configured, hinges 92 provide a number of functions. First, of course, they allow the sections to be hingedly rotated between their respective stored and deployed positions. Secondly, by removing pins 98, these sections can be unlatched one from another. Finally, bars 96 space the adjacent members far enough apart to allow gate sections 100 to be slidably inserted across the passageway 102 through which the livestock are moving as defined by the respective opposed spaced side members as shown in FIGS. 3 and 4.

The remaining objectives of the present inventions are achieved by the two pairs of sections labelled 104 and 106, respectively, in FIGS. 9, 10, 11, 12, and 18. Sections 104 are extended sections adapted to be slid through opening 22 and stored within trailer section 10 during transportation. Following deployment of the remaining sections, sections 104 are slid out through opening 22 and attached to vertical sections 20 to form a loading/unloading chute extending between vertical opening 22 and a ramp 108 associated with the vehicle being loaded or unloaded. A pair of shorter sections 106 are hingedly attached to the end of sections 104 adjacent ramp 108 to funnel the livestock between the narrow passageway defined between sections 104 and ramp 108.

With particular reference to FIGS. 14 and 19, the incorporated provisions for cutting out selected animals are shown. The openings engaged to be hereinafter described can be incorporated in separate sections 104 as shown in FIG. 19 or, alternatively, can be incorporated in the same section 104. One section 104 is provided with an opening 110 through which individual animals can be moved. A gate 112 is hingedly attached to the section 104 adjacent 110 so as to be movable as indicated by the arrow 114 between a position blocking opening 110 and a second position as shown ghosted in FIG. 19 wherein the passageway 102' defined by the two sections 104 is blocked and opening 110 is unblocked whereby livestock moving through passageway 102' will pass out through opening 110 as indicated by the arrow 116. Additionally, a second gate 118 is disposed between opening 110 and vertical opening 22 so as to be foldable against the section 104 to allow free passage through passageway 102' or to block passageway 102' as shown in its ghosted position. Used in combination, gates 112 and 118 allow a single animal to be trapped therebetween and withdrawn from passageway 102' through opening 110.

Referring now to FIGS. 20 and 21, an alternate embodiment of the trailering section is shown which provides a completely clear path for the movement of the livestock inasmuch as the wheels are moved to the outside. The trailering section, indicated therein as 10', has the two pairs of vertical side members 16, 20 replaced by a single pair of vertical side members 120 tapering smoothly from the back toward the front. The base 14' is correspondingly tapered. The wheel housings 40 (containing wheels 42 and their associated mounting apparatus as hereinbefore described) are outside of the vertical side members 120 whereby there is no obstruction whatsoever to the movement of the livestock therethrough. This embodiment can be particularly beneficial when used with smaller animals such as sheep. Note that the support members 49 are mounted on the ends of support arms 122 attached to vertical side members 120 as by welding. This is necessary to properly position the support members 49 for holding trailering section 12 in its straddled position. For convenience in understanding the construction of trailering section 10', much of the additional apparatus shown in the plan view of FIG. 20 has been omitted from FIG. 21.

Thus, it can be seen that the various components of the present invention combine to provide a portable corral structure particularly suited for ease of transporting and employment while, at the same time, providing a sturdiness and incorporated features which allow full-scale use in the handling of large numbers of livestock as have heretofore been only available when employing heavy, permanent corral structures.

Wherefore, having thus described my invention, I claim:

1. In a portable corral for confining and directing the movement of livestock having a pair of rigid planar first side members adapted to be disposed vertically in spaced relationship to form a passageway therebetween for the movement of the livestock, each of said first side members having first releasable connector means on one end thereof and trailering means for supporting and transporting said first side members including a horizontal base member, a pair of rigid planar second side members connected to said base member vertically in spaced relationship to form a passageway therebetween for the movement of the livestock, each of said second side members having second releasable connector means on one end thereof for interconnecting with respective ones of said first releasable connector means to form an extended passageway for the livestock comprising said first and second side members in combination, each of said second side members including support means for holding respective ones of said first side members adjacent thereto for transporting, a pair of wheels for supporting said trailering means when transporting said first side members, a pair of adjustable wheel mounting members rotatably carrying respective ones of said wheels and attached to said base for movement between a transporting position with said base raised with ground clearance for travelling and a deployed position with said base resting on the ground whereby by livestock can walk on said base between said side members, and a pull-tongue connected on one end to said base member and including means on the other end for connecting to a vehicle pulling said trailering means, the improvement wherein said pull-tongue comprises:
    (a) a first tongue member hingedly attached on one end to said base adjacent one side thereof and having said vehicle connecting means on the other end; and
    (b) a second tongue member hingedly attached on one end to said base adjacent the side opposite the attachment of said first tongue member and having releasable means on the opposite end for connecting to said first tongue member adjacent said vehicle connecting means whereby said two tongue members can be connected in a Y-shape for pulling said trailering means and can be disconnected and hingedly rotated away from the path of the livestock during deployment with said base resting on the ground; and additionally comprising,
    (c) a self-supporting corral section comprising a pair of rigid planar third side members disposed vertically in parallel-spaced relationship to form a passageway therebetween for the movement of the livestock, said third side members being spaced apart a distance slightly wider than said second side members at their widest point to allow said third side members to straddle said second side members for transporting said portable corral;
    (d) spacer means connected between said pair of third side members for holding said third side members in said vertical spaced relationship whereby said self-supporting corral section is made self-supporting, said spacer means being connected adjacent the top of said third side members to allow said spacer means to pass over said second side members when passing to and from said straddled position and to provide room thereunder for the passage of the livestock;
    (e) means carried by the trailering means for holding said self-supporting corral section in said straddled position and raised from contact with the ground for transporting said self-supporting corral section in combination with said trailering means and for releasing said self-supporting corral section to allow said self-supporting corral section to be slid from said straddled position into deployment for use; and, (f) means carried by said self-supporting corral section for releasably connecting said self-supporting corral section to said pair of first side members when said self-supporting corral section is deployed to, thereby, form an extended passageway for the movement of livestock comprising said self-supporting corral section and said first and second side members in combination, said releasable connecting means including a pair of rigid planar fourth side members each hingedly connected on one end to respective ones of said third side members on the same end of said self-supporting corral section, said fourth side members being rotatable about said hinged attachment between a stored position adjacent said third side members and a deployed position extending outwardly from said third side members to contact respective ones of said first side members whereby said passageway for the movement of livestock comprises said first, second, third, and fourth side members in combination.

2. The portable corral of claim 1 and additionally comprising:
   (a) said base member of said trailering means tapering towards the points of attachment of said first and second tongue members respectively on each side of said end having said pull-tongue thereon;
   (b) a pair of rigid planar fifth vertical side members connected to respective ones of said second side members on one end and tapering towards said pull-tongue containing end to form a narrow vertical opening thereat for the restricted passage therethrough of the livestock and,
   (c) a pair of extended rigid planar sixth vertical side members adapted to be slid through said opening for storage within said trailering means during transporting of said corral and including means on one end for releasably hingedly attaching said sixth side members to respective ones of said fifth side members extending outwardly therefrom to form a loading and unloading chute connected to the corral.

3. The portable corral of claim 2 wherein:
   (a) one of said sixth vertical side members has an outlet opening therein for the passage of a single animal therethrough and a first gate hingedly attached thereto for movement between a first position blocking said outlet opening and a second position blocking the chute to the passage of an animal therethrough and unblocking said outlet opening; and,
   (b) one of said sixth vertical side members has a second gate hingedly attached thereto between said outlet opening and said vertical opening for movement between a first position blocking said chute for the passage of livestock therethrough and a second position unblocking said chute whereby selected animals can be cut from the livestock passing through the chute.

4. In a portable corral for confining and directing the movement of livestock having a pair of rigid planar first side members adapted to be disposed vertically in spaced relationship to form a passageway therebetween for the movement of the livestock, each of said first side members having first releasable connector means on one end thereof and trailering means for supporting and transporting said first side members including a horizontal base member, a pair of rigid planar second side members connected to said base member vertically in spaced relationship to form a passageway therebetween for the movement of the livestock, each of said second side members having a second releasable connector means on one end thereof for interconnecting with respective ones of said first releasable connector means to form an extended passageway for the livestock comprising said first and second side members in combination, each of said second side members including support means for holding respective ones of said first side members adjacent thereto for transporting, a pair of wheels for supporting said trailering means when transporting said first side members, a pair of adjustable wheel mounting members rotatably carrying respective ones of said wheels and attached to said base for movement between a transporting position with said base raised with ground clearance for travelling and a deployed position with said base resting on the ground whereby the livestock can walk on said base between said second side members, and a pull-tongue connected on one end to said base member and including means on the other end for connecting to a vehicle pulling said trailering means, the improvement wherein said pull-tongue comprises:
   (a) a first tongue member hingedly attached on one end to said base adjacent one side thereof and having said vehicle connecting means on the other end; and,
   (b) a second tongue member hingedly attached on one end to said base adjacent the side opposite the attachment of said first tongue member and having releasable means on the opposite end for connecting to said first tongue member adjacent said vehicle connecting means whereby said two tongue members can be connected in a Y-shape for pulling said trailer and can be disconnected and hingedly rotated away from the path of the livestock during deployment with said base resting on the ground; and additionally comprising,
   (c) said base member of said trailering means tapering towards the points of attachement of said first and second tongue members respectively on each side of said end having said pull-tongue thereof;
   (d) a pair of rigid planar third vertical side members connected to respective ones of said second side members on one end and tapering towards said pull-tongue containing end to form a narrow vertical opening thereat for the restricted passage therethrough of the livestock; and,
   (e) a pair of extended rigid planar fourth vertical side members adapted to be slid through said opening for storage within said trailering means during transporting of said corral and including means on one end for releasably hingedly attaching said fourth side members to respective ones of said third side members extending outwardly therefrom to form a loading and unloading chute connected to the corral.

5. The portable corral of claim 4 wherein:
   (a) one of said fourth vertical side members has an outlet opening therein for the passage of a single animal therethrough and a first gate hingedly attached thereto for movement between a first position blocking said outlet opening and a second position blocking the chute to the passage of an animal therethrough and unblocking said outlet opening; and, (b) one of said fourth vertical side members has a second gate hingedly attached thereto between said outlet opening and said vertical opening for movement between a first position blocking said chute to the passage of livestock therethrough and a second position unblocking said chute whereby selected animals can be cut from the livestock passing through the chute.

* * * * *